E. FROHWERK.
NON-KICK DEVICE.
APPLICATION FILED SEPT. 17, 1917.
1,348,989. Patented Aug. 10, 1920.
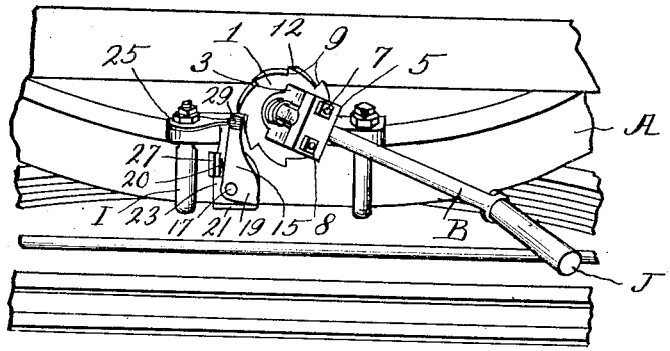
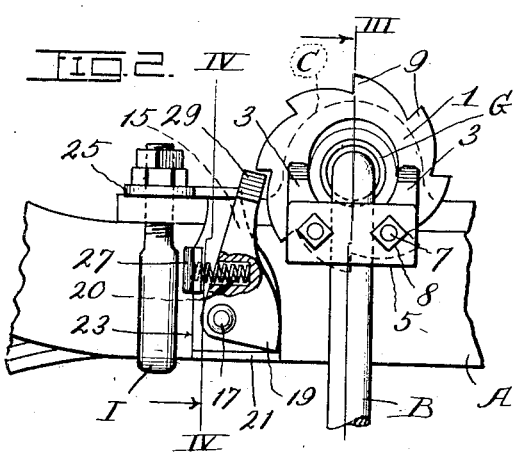
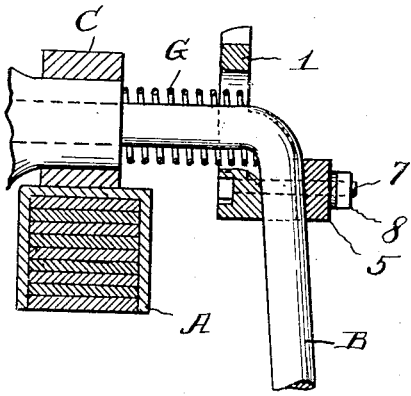
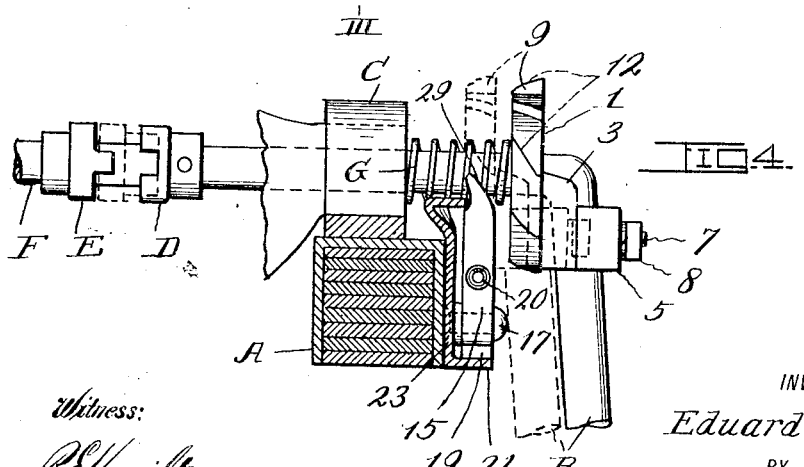
INVENTOR:
Eduard Frohwerk,
BY F. G. Fischer,
ATTORNEY.
Witness:
R. E. Hamilton

UNITED STATES PATENT OFFICE.

EDUARD FROHWERK, OF KANSAS CITY, KANSAS.

NON-KICK DEVICE.

1,348,989.  Specification of Letters Patent.  Patented Aug. 10, 1920.

Application filed September 17, 1917. Serial No. 191,767.

*To all whom it may concern:*

Be it known that I, EDUARD FROHWERK, a citizen of the United States, residing at Kansas City, in the county of Wyandotte and State of Kansas, have invented certain new and useful Improvements in Non-Kick Devices, of which the following is a specification.

My invention relates to nonkick devices for automobiles, and my object is to provide a simple, inexpensive, and efficient device of this character which can be readily attached to Ford and other cars not provided with self-starters, in order to avoid accidents frequently resulting by the motor back-kicking while being manually cranked.

In order that the invention may be fully understood, reference will now be made to the accompanying drawing, in which:

Figure 1 is a broken, perspective view of the front portion of a Ford car provided with my device.

Fig. 2 is a broken, front elevation, enlarged, of some of the parts disclosed by Fig. 1.

Fig. 3 is a broken, vertical section on line III—III of Fig. 2.

Fig. 4 is a broken, vertical section on line IV—IV of Fig. 2.

A, designates a transverse member of the automobile frame. B, designates the customary starting crank, which is journaled in a bearing C, secured to the frame member A. The rear end of the starting crank B, has the usual clutch member D, for engagement with a companion clutch member E, on the motor shaft F, so that when the crank B is revolved the motor shaft may be rotated therewith to start the motor through the intermediacy of said clutch members D and E. The clutch member D is ordinarily held out of engagement with the clutch member E, by the customary coil spring G, bearing at one end against the bearing C, and at its opposite end against the starting crank B.

The cam wheel 1 is provided with a pair of oppositely-disposed, forwardly-projecting flanges 3, between which the starting crank B extends, so that when the same is rotated it will also rotate the cam wheel 1 therewith. The flanges 3 thicken and thus reinforce the front face of the cam wheel 1 and are provided at their forward ends with a removable cap 5, secured thereto by stud bolts 7 and retaining nuts 8, thus when the starting crank B is moved longitudinally to throw the clutch member D into or out of engagement with the companion member E, said cam wheel 1 will move therewith. The cam wheel 1 is provided with a plurality of peripheral ratchet-like teeth 9, the rear sides 12 of which are beveled as shown on Fig. 4.

15 designates a shift member for coacting with the cam wheel 1 in a manner hereinafter described. Said shift member 15 is mounted at its lower end upon a pivot 17 and has a shoulder 19 normally held by a coil spring 20 against a stop 21, projecting forwardly from the lower portion of a supporting member 23 which is provided at its upper end with an eye 25, secured to one of the clips I of the automobile, and carries the pivot 17. The shoulder 19 and the stop 21 limit the movement of the shift member 15 to the right when the cam wheel 1 is adjusted outwardly to the full line position disclosed by Fig. 4.

The coil spring 20 is interposed between the shift member 15 and a lug 27 projecting forwardly from the supporting member 23. The upper end of the shift member 15 has a beveled terminal 29, sloping in the same direction as the bevel surfaces 12 of the teeth 9 on the cam wheel 1.

In practice, when the operator desires to crank the motor he grasps the handle J of the starting crank and pushes the same inwardly against the action of the spring G until the clutch member D engages the clutch member E. The crank is then revolved clockwise during which operation the teeth 9 on the cam wheel 1 freely pass the shift member 15, which is forced outwardly successively against the action of the spring 27 as each tooth passes. However, should the motor back-fire and start to revolve the starting crank backwardly, the clutch member D is automatically thrown out of engagement with the clutch member E before the operator can be injured, by the beveled side 12 of the first tooth 9 contacting the beveled terminal 29 of the shift member 15, which pushes the cam wheel 1 and the crank outwardly until the clutch member D is thrown out of engagement with the clutch member E. Thus the starting crank B is prevented from rotating backwardly with the motor shaft.

From the foregoing description it is apparent that I have produced a device embodying the advantages above enumerated, and while I have shown and described the preferred form of the invention, I reserve the right to make such changes in the construction, proportion, and arrangement of parts as properly fall within the spirit and scope of the claims.

Having thus described my invention, what I claim and desire to secure by Letters Patent, is:

1. In a device of the character described, the combination with a motor shaft having a clutch member at its forward end, a starting crank having a clutch member at its rear end for engagement with the first-mentioned clutch member, a bearing in which said starting crank is journaled, and a coil spring having one end abutting said bearing and its opposite end abutting the starting crank to normally hold the clutch member thereon out of engagement with the companion clutch member, of a cam wheel having a large axial opening to fit freely over the starting crank and the coil spring and provided with beveled teeth, means for removably securing said cam wheel to the starting crank, and a shift member adapted to engage the beveled teeth on the cam wheel and force the same outwardly with the starting crank should the motor shaft rotate backwardly while being cranked.

2. In a device of the character described, the combination with a motor shaft having a clutch member at its forward end, a starting crank having a clutch member at its rear end for engagement with the first-mentioned clutch member, a bearing in which said starting crank is journaled, and a coil spring having one end abutting said bearing and its opposite end abutting the starting crank to normally hold the clutch member thereon out of engagement with the companion clutch member, of a cam wheel having a large axial opening to fit freely over the starting crank and the coil spring and provided with beveled teeth, means for removably securing said cam wheel to the starting crank, a supporting member adjacent the cam wheel and provided with a stop and a lug, a pivot projecting from said supporting member, a shift member mounted on said pivot and provided with a shoulder for engagement with the stop, and a spring abutting the lug and said shift member to press the same against the beveled teeth on the cam wheel to force the latter outwardly with the starting crank should the motor shaft rotate backwardly while being cranked.

3. An anti-kick cranking device for automobiles, comprising a ratchet wheel constructed in such a manner that it can be slipped over the starting crank handle of the automobile and arranged in operative position on the horizontal portion of the starting crank, means for rigidly securing said ratchet wheel to the starting crank, a bracket constructed in such a manner that it can be secured to the front cross member of the frame of the automobile by one of the front spring hanger bolts, and a spring-pressed pawl pivotally mounted on said bracket, the rear sides of the teeth on said ratchet wheel being inclined or curved inwardly from the periphery toward the center of said ratchet wheel and said pawl being provided on its front side with a forwardly and downwardly inclined surface, for the purpose described.

4. A cranking device for internal combustion engines, comprising a manually operable starting crank provided with a clutch member that is adapted to be moved into engagement with a coöperating clutch member on the drive shaft of the engine during the operation of cranking the engine, a detachable spring-pressed pawl carried by a part that is stationary with respect to the rotary movement of said starting crank, a ratchet wheel detachably mounted on said starting crank in front of the bearing support therefor, and provided with teeth over which the end of said pawl snaps during the operation of cranking the engine, and coöperating surfaces on said ratchet wheel and on said pawl formed in such a manner that retrograde movement of the drive shaft of the engine during the cranking operation will automatically move the starting crank forwardly and disconnect it from the drive shaft.

5. A cranking device for internal combustion engines, comprising a manually-operable starting crank that is adapted to be moved rearwardly so as to connect it with the drive shaft of the engine, a part adapted to be slipped over the handle of said starting crank and provided with a cam surface, and a member that coöperates with said cam surface to move said starting crank forwardly, thereby automatically disconnecting it from the drive shaft of the engine whenever said drive shaft kicks back during the operation of cranking the engine.

6. A cranking device for internal combustion engines, comprising a manually-operable starting crank that is adapted to be moved rearwardly so as to connect it with the drive shaft of the engine, a part adapted to be secured to the crank and having an eccentrically located opening adapted to pass over the crank handle and provided with a cam surface, the front face of said part adjacent the opening being thickened to provide a reinforcement, and a member that coöperates with said cam surface to move said starting crank forwardly, thereby automatically disconnecting it from the drive shaft of the engine whenever said drive shaft kicks back during the operation of cranking the engine.

7. A cranking device for internal combustion engines, comprising a manually-operable starting crank provided with a clutch member that is adapted to be moved into engagement with a coöperating clutch member on the drive shaft of the engine during the operation of cranking the engine, a ratchet wheel rigidly mounted on said starting crank at the bend thereof, a spring-pressed pawl arranged so that it will snap over the teeth on said ratchet wheel during the operation of cranking the engine, and coöperating inclined surfaces or cam surfaces on said pawl and ratchet wheel arranged in such a manner that retrograde movement of the drive shaft of the engine during the cranking operation will automatically disconnect the starting crank from said drive shaft.

8. A cranking device for internal combustion engines, comprising a starting crank provided with a clutch member that is adapted to be engaged with a coöperating clutch member on the drive shaft of the engine by moving said starting crank rearwardly, a spring-pressed pawl pivotally mounted on a stationary part of the structure that carries the starting crank, a forwardly and downwardly inclined surface on the upper end of said pawl, and a ratchet wheel on said starting crank at the bend thereof that moves into engagement with said pawl when the starting crank is moved rearwardly, the rear sides of the teeth on said ratchet wheel being inclined or curved for the purpose described.

9. An anti-kick device for manually-operable starting cranks for internal combustion engines, comprising a ratchet wheel having a hole of such diameter that the ratchet wheel can be slipped over the starting crank handle and arranged in operative position on said crank in proximity to the axis of rotation of said crank, and a spring-pressed pawl carried by a stationary part of the structure in which the starting crank turns, said pawl being provided on its front side with a forwardly inclined surface and said ratchet wheel being provided on its rear side with cam surfaces, for the purpose described.

In testimony whereof I affix my signature in the presence of two witnesses.

EDUARD FROHWERK.

Witnesses:
 F. G. FISCHER,
 L. J. FISCHER.